Dec. 27, 1960    H. E. GOLDBERG    2,966,091
INDUSTRIAL REFRACTOMETERS

Filed Aug. 31, 1955    3 Sheets-Sheet 1

INVENTOR.
BY Herbert E. Goldberg

Dec. 27, 1960  H. E. GOLDBERG  2,966,091
INDUSTRIAL REFRACTOMETERS
Filed Aug. 31, 1955  3 Sheets-Sheet 2
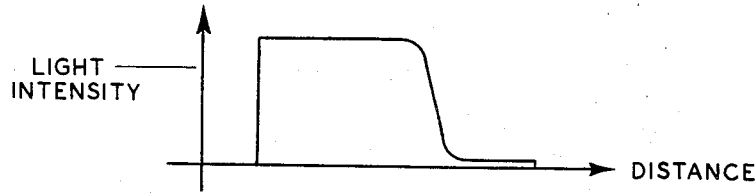
FIG. 2
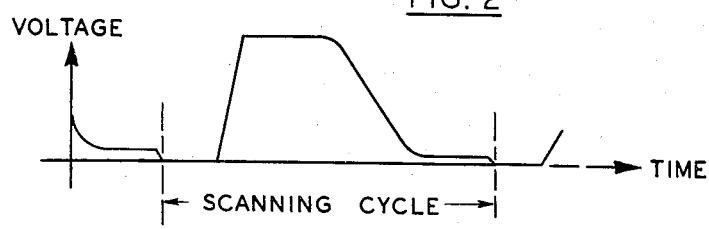
FIG. 3
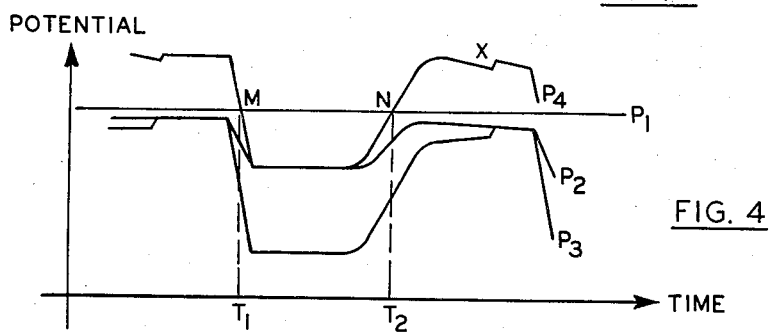
FIG. 4
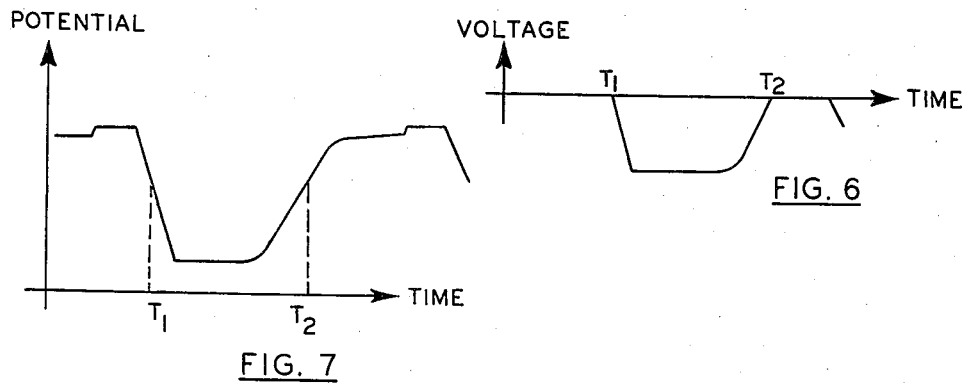
FIG. 6
FIG. 7
INVENTOR.
BY Herbert E. Goldberg Dec. 27, 1960     H. E. GOLDBERG     2,966,091
INDUSTRIAL REFRACTOMETERS Filed Aug. 31, 1955     3 Sheets-Sheet 3

INVENTOR.
BY Herbert E. Goldberg

United States Patent Office

2,966,091
Patented Dec. 27, 1960

2,966,091

INDUSTRIAL REFRACTOMETERS

Herbert E. Goldberg, West Simsbury, Conn.
(R.D. 2, Keene, N.H.)

Filed Aug. 31, 1955, Ser. No. 531,646

9 Claims. (Cl. 88—14)

This invention relates to refractometers, and more particularly to the type which is based on the measurement of the critical angle of total reflection and generally used in the chemical and food processing industries.

Most refractometers of this type are visual instruments in which the position of a boundary line, dividing the field of vision into bright and dark portions, is observed against a fixed scale. In other cases the boundary line is made to coincide with a reticle through a calibrated manual control and the reading is given by the position of this control.

There also are refractometers of these general types in which the position of the boundary line is tracked automatically by servo driven, or so called closed loop or closed cycle follow-up systems and recorded on a chart. Because of the presence of synchronous and/or servo motors in these automatic instruments, they are generally costly and often too bulky to be installed in existing concentrating or processing equipment. They have not come into general use.

It is an object of the present invention to provide an automatically indicating, recording and/or controlling refractometer of the critical angle type in which the position of the boundary line is monitored by substantially electrical means of the open loop type, thus greatly reducing the size and weight of the refractometer head. It is a further object of the invention to provide circuits which will indicate the true average position of the boundary line in the refractometer field irrespective of lack of sharpness sometimes caused by colloidal, non-homogeneous or otherwise light-diffusing substances.

Lastly it is an object of the invention to provide an instrument of the type described which gives readings unaffected by changes of the supply voltages, the color, optical characteristics or temperature of the substances to be controlled.

According to the invention the position of the boundary line in the image plane is being measured by scanning the image plane photoelectrically, and by analyzing or averaging the scanning signal with appropriate electrical circuits or meters.

The operation of such refractometers is explained in detail in the following specification and in the attached drawings in which:

Figure 2 is a diagram showing the light distribution in the image plane of the refractometer.

Figure 3 is a diagram of the signal received by a phototube while the image plane is scanned by a slit of finite width as shown in Figure 9.

Figure 4 is a diagram showing the electrical potential of various points of the circuit of Figure 1 during the scanning cycle.

Figure 6 shows a plot against time of the signal generated in the circuit of Figure 5.

Figure 7 shows a plot against time of the potential of point $P_3$ in the circuit of Figure 1.

Figure 1A:
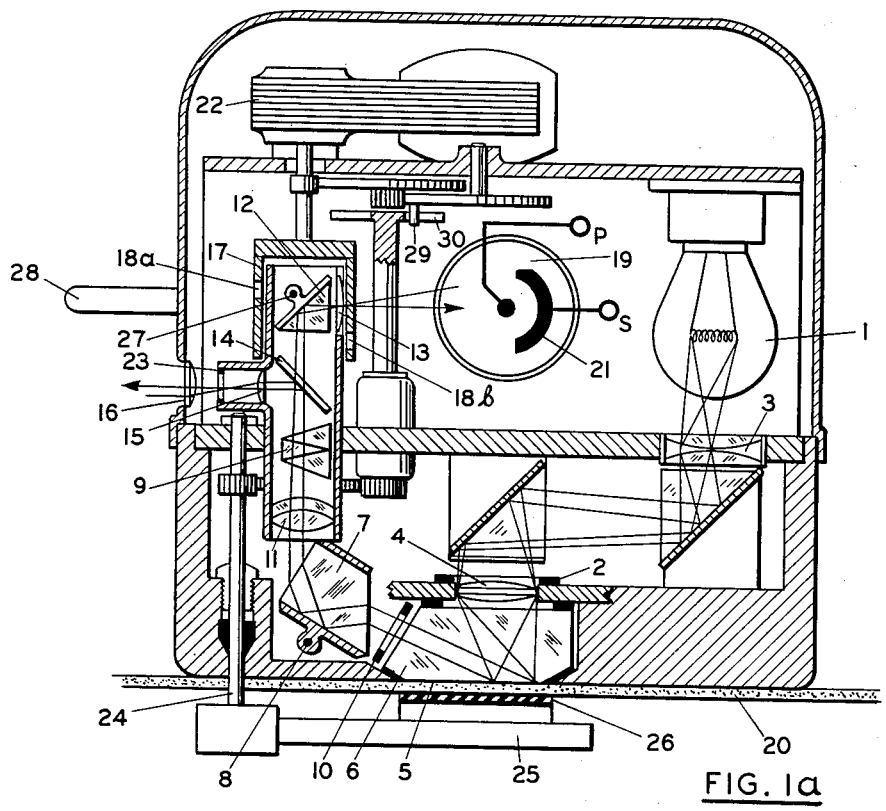
Figure 1a is a cross sectional view in elevation of a process refractometer based on the measurement of the critical angle of total reflection.

A refractometer of the critical angle type is shown in Figure 1a. It is composed of an illuminating unit, a prism, and an imaging system. In the illuminating unit a light source 1, of the concentrated filament type is imaged in the aperture 2 by the condenser lens 3. An objective lens 4 forms an image of the condenser lens 3 on the face 5 of the main prism 6, providing there an area of substantially uniform illumination.

The image forming part of the refractometer consists of the main prism 6, a deviation prism 7, which pivots about an axis 8, normal to the plane of the drawing, a rotatable compensation prism 9 which may be replaced by a filter or omitted in some cases. It also comprises an aperture stop 10, an objective lens 11, a deflecting prism 12, a field lens 13, and in some cases a semi-transparent mirror 14, a second field lens 15, and an eyepiece 16, and a scale 23.

The photoelectric sensing system is composed of a scanning drum 17, carrying a helical slot 18a, b and a photoelectric cell 19 which may be of the multiplier type. If necessary a second photoelectric tube could be substituted for the eye lens 16.

The layer of the substance 20 to be checked is in contact with face 5 of prism 6. It is illuminated as explained above and acts by diffusion as a secondary light source. In some special cases an optical system illuminating the substance 20 from below by transmission may be useful, especially in bench refractometers where it could be swung out of the way for cleaning of the face of prism 6. After refraction at the face 5 the light flux is brought to focus by the image forming system, producing the well known shadow in the image plane of the refractometer which is located in the image plane at the field lens 13. The field lens 13 forms an image of aperture stop 10 on the photosensitive surface 21. In this way the same area of the photo surface is used, regardless of changes of refractive index.

The scanning drum 17 carries a helical slot 18a, b. When the drum is rotated by a motor 22 the portion of the slot which covers the field lens 13 will move across the image plane in a vertical direction repeating this motion periodically once for each turn of the drum 17.

It is of course, equally feasible to generate scanning action by moving one of the optical elements, such as prism 12, and keeping the scanning slit stationary.

Figures 1B, 9:
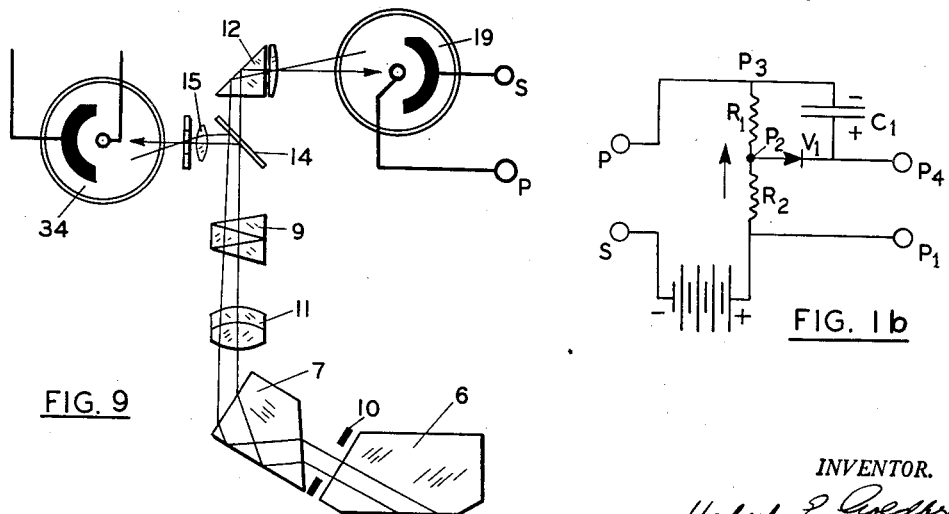
Figure 1b shows schematically a circuit useful for detecting the position of the center of the shadow boundary in the image plane of the refractometer.
Figure 9 is a schematic cross sectional view of the optical system of a process refractometer, illustrating the use of a beam splitter and separate photoelectric tube to measure the illumination prevailing in a portion of the image plane.

The photoelectric tube 19 is connected to a condenser-resistor-rectifier network shown in Figure 1b which serves to fix the time at which a scanning slit passes the center of the shadow boundary in the image plane.

As the bright portion of the image is passed by the scanning slit a relatively heavy current flows through the load resistors $R_1$ and $R_2$ in the direction of the arrow. The condenser $C_1$ is thus charged through rectifier $V_1$ to the polarity shown in the drawing. However, as the boundary of the shadow is passed by the scanning slit, the load current decreases and the potentials of points $P_2$ and $P_3$ rise. If the time constant of the condenser-rectifier combination $C_1$ and $V_1$ is large compared to the duration of the scanning cycle, the potential drop across condenser $C_1$ will remain substantially constant and the potential of point $P_4$ will rise above $P_2$ and will reach that of point $P_1$ when the load current has dropped to half its original value. This indicates that the scanning slot has travelled half way across the boundary of the shadow. The time elapsed from the start of the scanning cycle to the instant when potentials of $P_4$ and $P_1$ are equal depends on the position of the boundary of the shadow in the image plane and is a measure of the refractive index of the substance 20 in contact with main prism 6.

This phenomenon is further illustrated in Figures 3 and 4 which show the light signal received by the phototube during the scanning cycle and the corresponding electrical potentials of points $P_1$, $P_3$ and $P_4$. The condition at instant $T_1$ in Figure 4 is reached when the scanning slit has entered the bright portion of the image plane, and condition at instant $T_2$ (Figure 4) occurs when the slit passes the center of the shadow boundary. The gradual fall of the curve at $T_1$ is due to the finite width of the scanning slit and the gentle slope marked X is caused by the slow discharge of the condenser through the rectifier.

The problem of measuring refractive index is thus reduced to the measurement of the fraction which the time interval between points $T_1$ and $T_2$ occupies in the whole scanning cycle. This may be done for instance by differentiating the signal. The sloping portions occurring at times $T_1$ and $T_2$ would thus generate pulses of opposite polarity and the time interval between such pulses could be measured by any of the well known timing circuits.

Figure 5:
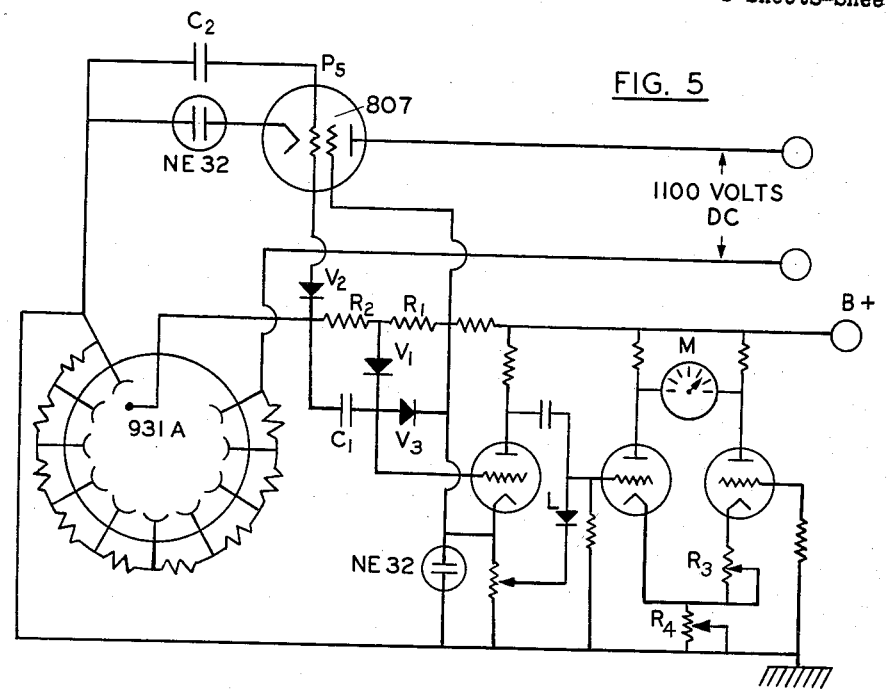
Figure 5 shows schematically a complete electronic indicating circuit providing a voltage directly related to refractive index or composition of a sample.

A closer measurement of the actual position of the actual half way points M and N on the steeply sloping portions and the interval between them is obtained, however, by depending on the potential difference, $P_4$ minus $P_1$. This potential difference changes sign at instants $T_1$ and $T_2$. If fed into discharge tubes it would generate pulses and the interval between instants $T_1$ and $T_2$ could again be timed. A preferred circuit is ilustrated in Figure 5. It shows a rectifier $V_3$ which suppresses either the positive or the negative half wave of the signal $P_4-P_1$ depending on the polarity with which it is connected. The rectified signal as given by the connection used in Figure 5 is shown in Figure 6. After amplification by a tube and after passing a limiter L and after further amplification by a second tube this signal consists of pulses of substantially rectangular shape. Their duration is measured directly on an averaging D.C. volt meter M as shown, or in other well known ways.

The meter may, of course, be calibrated directly in terms of refractive index or other characteristics of the substance in contact with face 5 of prism 6. If the relationship between these other characteristics and the refractive index depends on the temperature of the sample, temperature compensation may be introduced by adjusting certain circuit elements manually or by making them automatically temperature dependent. An additive correction could be introduced for instance by modifying cathode resistor $R_3$, and a proportional adjustment would be obtained if common resistor $R_4$ were changed.

Several auxiliary devices are important to insure proper functioning of these circuits in certain cases.

Sometimes, when the substance is very clear, not enough light is scattered back into the instrument. A diffusing screen must then be provided close to face 5 or 6. On the other hand, if the substance in contact with the prism is very turbid, it is apt to deposit solid particles and the prism face should be cleaned from time to time. A motor driven wiper shown in Figure 1 serves both purposes. It consists of a shaft 24, a blade holder 25, and one or more blades 26 made of white rubber or similar material. Shaft 24 executes a slow oscillating motion pushing the blade 26 across prism face 5. When in the position shown in the drawing the blade edge is illuminated and serves as diffusing screen and secondary light source.

For a reliable and simple electronic circuit the greatest possible ilumination should be provided at the prism face 5. Since strictly continuous measurements are not normally required in the food and chemical industries, the illumination may be raised temporarily by increasing the lamp voltage above the nominal value whenever the servo system is active. In a typical case, measurements might be made twice a minute for a three-second period each. The wiper would be at rest most of the time and would be driven at a suitable rate by an intermittent mechanism and come to rest again in the correct position on the prism face just before a measurement is taken. A typical intermittent movement of the Genera type is shown in Fig. 1. It consists of a continuously rotating drive pin 29 and a star wheel 30. The lamp voltage is raised and the amplifier circuit activated while the wiper is at rest.

It is, of course, desirable to operate these electronic circuits under the most favorable signal to noise ratio and to prevent poor response due to low signal strength or over-loading. If a multiplier type of phototube is used the signal strength may be regulated by controlling the dynode accelerating potential manually or by the feed back circuit illustrated in Figure 5 which is well known except for the holding network composed of condenser $C_2$ and rectifier $V_2$. This network allows adjustment of the control tube grid voltage while the bright part of the image plane is scanned but prevents the potential of point $P_5$ from rising and thus holds this grid voltage while the scanning slit passes over the dark part of the image plane. The control tube of course, could also be monitored by a separate phototube 34 substituted for eye lens 16 as shown in Figure 9.

Since the level of the signal shown in Figure 6 depends only on the illumination in the bright part of the image plane it would now be substantially constant making further limiting in the amplifier unnecessary in many applications.

Similar results are obtained if the lamp current is controlled to provide constant illumination in the bright portion of the image plane. Feed back circuits controlling a light source to provide constant illumination are well known and need not be described here in detail. Such feed back circuits would be monitored in the same way as the dynode voltage control circuit just described.

The time constants of the various holding networks discussed so far must be carefully controlled depending on the accuracy demanded. Referring to the basic circuit shown in Figure 1b and assuming for instance that the scanning cycle is $t$ seconds it may take $0.02t$ seconds for the boundary zone of the shadow to be passed by the scanning slit. If it is demanded now that the charge of condenser $C_1$ should not decrease by more than 0.1% during this time, it is found that the time constant of the discharge network including the rectifier must be larger than $10t$. On the other hand if the discharge time constant is $10t$, and if the dark part of the scanning cycle is long (low index of refraction), the condenser could lose during the scanning cycle as much as 10% of its initial charge. If it is now demanded that it should recover within the time $0.1t$ to at least .999 of the final charge it is found that the time constant of the charging network must be smaller than $0.02t$. The ratio of charging to discharging impedance would be 500 to 1 or higher. Impedance changing devices such as cathode follower circuits may be used to attain such ratios.

All circuits described so far function essentially by measuring time, but the information contained in the scanning signal may also be exploited by average illumination or energy measurements. The scanning signal generated at point $P_3$ of the circuit shown in Figure 1 is again reproduced in Figure 7. It is a pulsating D.C. voltage. The distance between $T_1$ and $T_2$ may now be found by dividing the average amplitude of the wave by its peak to peak amplitude. This assumes, of course, that the sloping portions of the wave are symmetrical with respect to the half amplitude points M and N, conditions which are well satisfied in practice.

Figure 8:
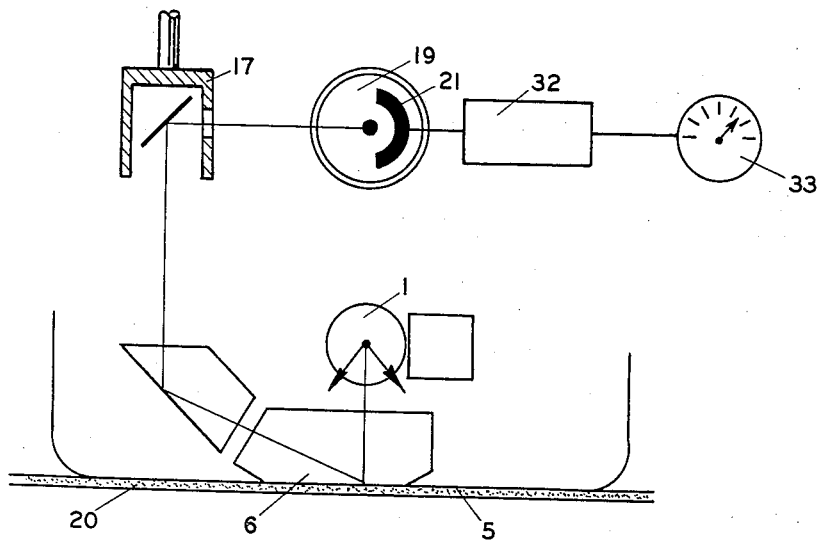
Figure 8 is a block diagram of a refractometer based on average current readings.

In many applications the peak to peak output voltage is regulated by the dynode voltage control circuit or automatic lamp current control already described, or by circuits controlling the gain of the amplifier. This latter system is pictured schematically in Figure 8. Of the essential components only the substance to be measured 20, main prism 6, light source 1, scanning drum 17 and phototube 19 have been shown. These elements function as explained above in connection with Figure 1. However, the output of phototube 19 is fed into a well known automatic volume control amplifier 32 which has been designed to deliver an output signal of constant peak to peak amplitude. This method of controlling the output signal thus takes into account the effect of light scattered into the dark portion of the field of view by scratches on the optical surfaces or other parasitic light. Since the peak to peak signal voltage is constant the output meter 33 could be calibrated directly in refractive index or product composition. Temperature compensation may again be introduced electrically, either by adding a D.C. voltage to the regulated signal for additive correction, or by adjusting the total gain of the system for proportional factors.

There are some simple applications where a manually controlled instrument is sufficient. In these cases manual scanning is substituted for continuous scanning by motor. The system is the same as shown in Figure 1 except that motor 22 and scanning drum 17 are eliminated. The phototube 19 thus responds to the entire light flux transmitted through the image plane. In order to make a measurement the operator first tilts the prism 12 counter clockwise about axis 27 by depressing a spring loaded lever 28. In this way the entire image plane becomes brightly illuminated. The amplification is then adjusted by the operator to give a signal of predetermined value. This replaces automatic level control previously discussed. When lever 28 is released, prism 12 snaps back to its normal position and the average illumination of the image plane is read on an instrument calibrated in index. Automatic or manual temperature adjustment is introduced as explained above.

Having thus described my invention, what I claim as new and desire to secure by Letters Patent is:

1. A refractometer of the critical angle of total reflection type said refractometer comprising a light source, a prism receiving light from said light source at various angles of incidence and having a prism face in contact with a material whose index of refraction is to be measured, an objective lens having a focal plane and receiving bundles of light refracted at several points of said prism face and forming therewith an optical image said optical image consisting of an illuminated area and a dark area in said focal plane, the brightness of each point of said illuminated area being established by light rays striking said several points of said prism face at equal orientation, scanning means to successively explore said brightness of said illuminated area, photo-electric means receiving light from said scanning means and generating a signal having a waveform depending solely on the distribution of said brightness in said illuminated area, said waveform having a peak value, electrical circuit means of the open loop type to operate on said signal, and indicating means actuated by the output of said electrical circuit means, said waveform of said signal being independent of said output of said electrical circuit means.

2. A refractometer according to claim 1 said refractometer comprising a beam splitter between said objective lens and said scanning means for receiving light from said objective lens, the light intercepted by said beam splitter forming a second optical image, and a second photo-electric means for measuring the brightness of a part of said second optical image.

3. A refractometer according to claim 1, said electrical circuit means being adapted to detect the instant at which the amplitude of said signal reaches a predetermined level substantially half of said peak value.

4. A refractometer according to claim 3, said circuit means including capacitor-rectifier networks whose charging time constant is shorter, and whose discharge time constant is longer than the scanning cycle.

5. A refractometer according to claim 1, said circuit means including a signal differentiating network to detect voltage gradients in said waveform of said signal, and means to measure the timing of said voltage gradients within said scanning cycle.

6. A refractometer according to claim 1 said refractometer comprising means to average the signal voltage over at least one scanning cycle.

7. A refractometer according to claim 1 said optical image in said focal plane comprising a substantially bright portion and a substantially dark portion, said refractometer including control means to adjust the output of said electrical circuit means, said control means being responsive only to the brightness prevailing in said substantially bright portion of said image.

8. A refractometer according to claim 1 said refractometer comprising motor driven prism wiping means having light reflecting properties, said prism wiping means coming to rest periodically on the face of said prism.

9. A refractometer according to claim 1 said refractometer comprising a beam splitter between said objective lens and said photo-electric means for receiving light from said objective lens, the light intercepted by said beam splitter forming a second optical image, a scale, and optical means for viewing said optical image on said scale.

References Cited in the file of this patent

UNITED STATES PATENTS

| | | |
|---|---|---|
| 2,624,014 | Barstow | Dec. 30, 1952 |

FOREIGN PATENTS

| | | |
|---|---|---|
| 982,346 | France | Jan. 24, 1951 |
| 690,268 | Great Britain | Apr. 15, 1953 |

OTHER REFERENCES

"Recording Differential Refractometer," Zaukelies et al., Analytical Chemistry, vol. 21, No. 6, June 1949, pages 743–745.